(12) United States Patent
Lee et al.

(10) Patent No.: US 12,428,776 B2
(45) Date of Patent: Sep. 30, 2025

(54) METHOD OF MANUFACTURING CARBON FIBER-REINFORCED COMPOSITE INCLUDING THERMAL BARRIER COATING LAYER

(71) Applicants: KOREA INSTITUTE OF SCIENCE AND TECHNOLOGY, Seoul (KR); UTAH STATE UNIVERSITY, Logan, UT (US)

(72) Inventors: Min Wook Lee, Wanju-gun (KR); Hee Jin Kim, Wanju-gun (KR); Jungwon Kim, Wanju-gun (KR); Juhyeong Lee, Incheon (KR)

(73) Assignees: Korea Institute of Science and Technology, Seoul (KR); UTAH STATE UNIVERSITY

( * ) Notice: Subject to any disclaimer, the term of this patent is extended or adjusted under 35 U.S.C. 154(b) by 260 days.

(21) Appl. No.: 18/461,948

(22) Filed: Sep. 6, 2023

(65) Prior Publication Data
US 2024/0076828 A1   Mar. 7, 2024

(30) Foreign Application Priority Data

Sep. 7, 2022   (KR) .................. 10-2022-0113204

(51) Int. Cl.
*D06M 11/45*   (2006.01)
*B29C 70/02*   (2006.01)
(Continued)

(52) U.S. Cl.
CPC .......... *D06M 11/45* (2013.01); *B29C 70/021* (2013.01); *B29C 70/48* (2013.01);
(Continued)

(58) Field of Classification Search
CPC ..................................... D06M 11/45
See application file for complete search history.

(56) References Cited

U.S. PATENT DOCUMENTS 9,939,222 B1 *   4/2018   Mulligan ............... B32B 15/20
2008/0214381 A1 *   9/2008   Balaguru ............ C04B 35/6269
501/95.2

(Continued)

FOREIGN PATENT DOCUMENTS

KR   20-0177490 Y1   4/2000
KR   10-1014407 B1   2/2011
(Continued)

OTHER PUBLICATIONS

Kim, Heejin et al., "Cold TBC process for carbon fiber-reinforced composite material", *The Korean Society of Mechanical Engineers material and breakdown section 2021-year spring conference collection of learned papers*, 2021, pp. 1.

(Continued)

*Primary Examiner* — Andrew T Piziali
(74) *Attorney, Agent, or Firm* — NSIP Law

(57) ABSTRACT

Disclosed herein a method of manufacturing a carbon fiber-reinforced composite including a thermal barrier coating layer, the method includes: preparing a thermal barrier coating layer; preparing a substrate including a carbon fiber fabric; and attaching the thermal barrier coating layer on an upper portion of the substrate and molding a composite with a resin transfer molding.

11 Claims, 15 Drawing Sheets

(51) Int. Cl.
*B29C 70/48* (2006.01)
*D06M 101/40* (2006.01)

(52) U.S. Cl.
CPC .... *D06M 2101/40* (2013.01); *D06M 2200/30* (2013.01); *D10B 2101/12* (2013.01)

(56) References Cited

U.S. PATENT DOCUMENTS

2011/0271876 A1* 11/2011 Alter .................. C04B 12/005
106/789
2013/0005856 A1* 1/2013 Phonthammachai .... C08K 3/36
977/773

FOREIGN PATENT DOCUMENTS

| KR | 10-1164058 | B1 | 7/2012 |
| KR | 10-2013652 | B1 | 8/2019 |
| KR | 10-2020127 | B1 | 9/2019 |
| KR | 10-2312419 | B1 | 10/2021 |

OTHER PUBLICATIONS

Lee, Seong-hyeon, "KIST develops high-temperature-resistant carbon fiber composite coating technology", *Chungchong news* Dec. 8, 2021, (https://www.ccnnews.co.kr/news/articleView.html?idxno=240659).

Lee, Jin-hee, "KIST develops carbon fiber composite coating technology usable at high temperatures", *Chungnamilbo* Dec. 8, 2021, (https://www.chungnamilbo.co.kr/news/articleView.html?idxno=636980).

Korean Office Action issued on Jan. 27, 2025, in corresponding Korean Patent Application No. 10-2022-0113204. (7 pages in English and 5 pages in Korean).

Kim, Heejin, et al. "Thermal barrier coating for carbon fiber-reinforced composite materials." Composites Part B: Engineering 225 (2021): 109308.

* cited by examiner

METHOD OF MANUFACTURING CARBON FIBER-REINFORCED COMPOSITE INCLUDING THERMAL BARRIER COATING LAYER

CROSS REFERENCE TO RELATED APPLICATION

The present application claims priority to Korean Patent Application No. 10-2022-0113204, filed Sep. 7, 2022, the entire contents of which is incorporated herein for all purposes by this reference.

BACKGROUND OF THE INVENTION

Field of the Invention

The present disclosure relates to a method of manufacturing a carbon fiber-reinforced composite including a thermal barrier coating layer, particularly for a method of manufacturing a carbon fiber-reinforced composite with a thermal barrier coating layer prepared with a carbon fiber fabric substrate including and a thermal barrier coating layer having a plurality of pores using a vacuum-assisted resin transfer molding method.

Description about National Research and Development Support

This study was supported by the technology development program of Ministry of Science and ICT, Republic of Korea (Projects No. 1711173313) under the superintendence of National Research Foundation of Korea.

DESCRIPTION OF THE RELATED ART

In general, a thermal barrier coating is applied to metal- and ceramic-based components that operate at a high temperature to ensure the thermal durability of underlying materials. The thermal barrier coating is typically achieved by heating and spraying a feedstock through a plasma jet, such as an air plasma spray (APS) method, or by depositing a vapor phase material created by an ion beam, such as an electron beam physical vapor deposition (EB-PVD).

However, considering that a carbon fiber-reinforced composite material (CFRP) has a lower thermal resistance than a metal component, and that the aforementioned EB-PVD method is performed at 800 to 1000° C., and that the temperature of the substrate is heated to about 1200° C. or more, traditionally spraying and vapor deposition methods are impractical to apply a thermal barrier coating to an CFRP and can cause significant thermal degradation of a matrix.

Therefore, to implement the thermal barrier coating on the CFRP, methods have been proposed to spray a ceramic particle mixture on the CFRP surface before the matrix cures, or to adhere a thermal barrier coating mat/layer directly to the CFRP surface and then cure and fix the matrix.

However, these methods have been found that the coating fails when the thermal barrier (ceramic) particles are detached from the CFRP substrate as the temperature increases, or when the thermal barrier particles are subjected to tension by the mechanical behavior of the CFRP.

Therefore, there is a strong need for a method to introduce a thermal barrier coating layer into the carbon fiber-reinforced composite material that can maintain thermal barrier performance over a range of high temperatures while maintaining structural integrity and high temperature resistance.

SUMMARY OF THE INVENTION

The present disclosure aims to solve the challenging problem in that it is not easy to use a conventional thermal barrier coating method for a carbon fiber-reinforced composite material, and is directed to providing a simple and effective method of introducing a thermal barrier coating to the carbon fiber-reinforced composite substrate.

In order to achieve the above-described technical objects, the present disclosure is directed to providing a method of manufacturing a carbon fiber-reinforced composite including a thermal barrier coating layer, the method may include: preparing a thermal barrier coating layer; preparing a substrate including a carbon fiber fabric; and attaching attaching the thermal barrier coating layer on an upper portion of the substrate and molding a composite with a vacuum-assisted resin transfer molding.

In addition, a thickness of the thermal barrier coating layer of the present disclosure may be 60 to 65% of a thickness of the substrate.

In addition, the preparing of the thermal barrier coating layer of the present disclosure may include a mixture of $\alpha$-$Al_2O_3$ powders with a ceramic binder, and subjecting the mixture to a first cure at 96° C., a second cure at 175° C., and a third cure at 275° C.

In addition, the $\alpha$-$Al_2O_3$ powders and the ceramic binder of the present disclosure may be mixed in a weight ratio of 3:1 to 4:1.

In addition, in the present disclosure, the thermal barrier coating layer completed to the third cure may include a plurality of pores, in which the pores may be formed by evaporation of moisture included in the ceramic binder, and in which the porosity of the thermal barrier coating layer may be 25 to 30%.

In addition, the resin transfer molding may be carried out using an epoxy resin as a matrix material, curing at 120° C. for one hour and at 150° C. for three hours, and in which the epoxy resin may be filled with the pores during the resin transfer molding.

In addition, a volume fraction of the carbon fiber fabric for the carbon fiber-reinforced composite of the present disclosure may be 60 to 65%.

In the present disclosure, a thermal barrier coating layer can be simply and effectively introduced into a carbon fiber-reinforced composite by a resin transfer molding method, and the thermal resistance and structural durability of a thermal barrier coating layer can be secured without including a separate adhesive component between the carbon fiber-reinforced composite and the thermal barrier coating.

BRIEF DESCRIPTION OF THE DRAWINGS

FIG. 5A and FIG. 5B are OM and SEM photographs of carbon fiber-reinforced composite specimens according to an embodiment of the present disclosure after a thermal shock test (500~700° C.), in which FIG. 5A illustrates a cross section thereof, and FIG. 5B illustrates a surface of the thermal barrier coating layer.

DETAILED DESCRIPTION OF THE INVENTION

Figure 1:
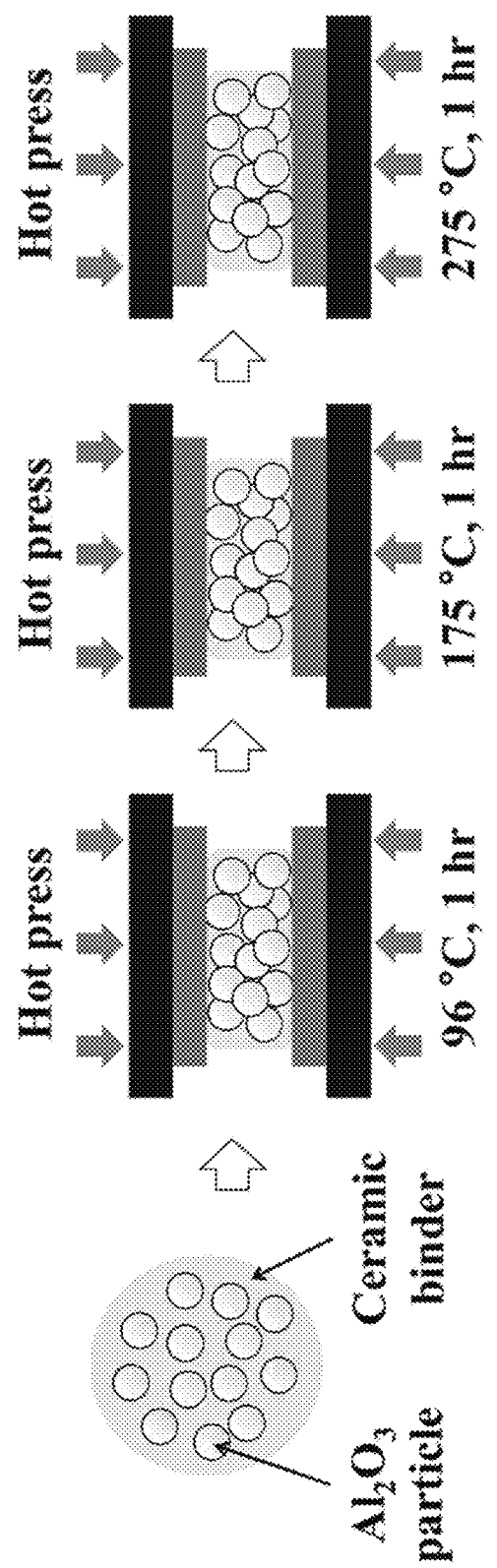
FIG. 1 schematically illustrates a step of preparing a thermal barrier coating layer according to an embodiment of the present disclosure.

Hereinafter, a method of manufacturing a carbon fiber-reinforced composite including a thermal barrier coating layer according to the present disclosure will be described, with reference to the accompanying drawings, through a specific embodiment of the present disclosure.

Prior to the description, the constituent elements having the same configurations in the several embodiments will be assigned with the same reference numerals and described only in the representative embodiment, and only the constituent elements, which are different from the constituent elements according to the representative embodiment, will be described in other embodiments.

EXPERIMENTAL EXAMPLE

FIG. 1 schematically illustrates a step of preparing a thermal barrier coating layer according to an embodiment of the present disclosure.

Specifically, it was manufactured using α-$Al_2O_3$ powders with an average particle diameter of 9.27 μm and a melting point of 2,072° C., and a ceramic binder including 30 wt % potassium silicate ($K_2SiO_2$) and 70 wt % distilled water. For reference, the decomposition temperature Td of the ceramic binder was 1,650° C. The α-$Al_2O_3$ powders and binder were manually mixed in a 3.3:1 weight ratio and subjected to initial curing at 96° C. for one hour and post-curing at 175° C. and 275° C. for one hour under a constant pressure of 300 KPa.

Figure 2:
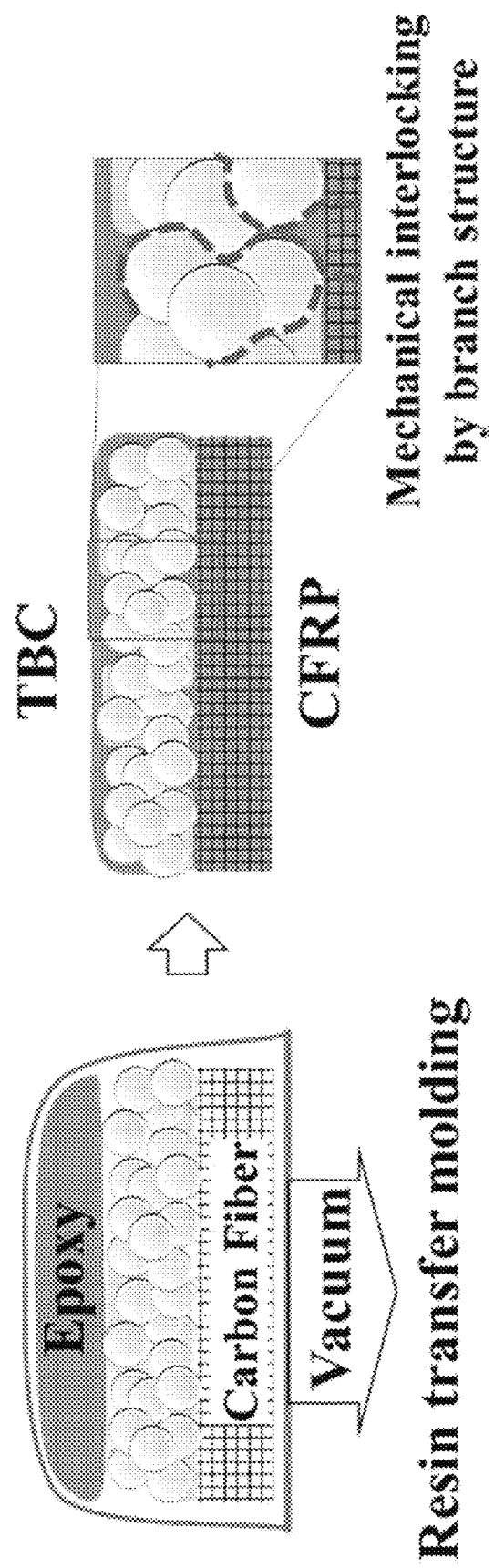
FIG. 2 schematically illustrates a step of forming a thermal barrier coating layer on a carbon fiber-reinforced composite through a resin transfer molding process according to an embodiment of the present disclosure.

FIG. 2 schematically illustrates a step of forming a thermal barrier coating layer on a carbon fiber-reinforced composite through a resin transfer molding process according to an embodiment of the present disclosure.

As illustrated in FIG. 2, a thermal barrier coating layer with a nominal thickness of 1.45 mm was placed on 12-ply carbon fiber fabrics stacked in a 0° direction and subjected to a vacuum-assisted resin transfer molding (VARTM) process. As a matrix material, epoxy resin was used, and a polyetheramine curing agent was added as an additive. The carbon fiber-reinforced composite specimens including the thermal barrier coating layer were cured at two-step temperatures of 120° C. and 150° C. for one hour and three hours, respectively. The nominal thicknesses of the cured carbon fiber-reinforced composite substrate and the entire composite with the thermal barrier coating layer were 2.4 mm and 3.85 mm, respectively. For reference, the volume fraction of the carbon fiber for the carbon fiber-reinforced composite was 63.48%.

In addition, since the thermal barrier coating layer may be applied additionally, the thickness of the coating layer was formed as thin as possible, and considering the weight gain or distortion of the coating layer due to different thermal expansion coefficients, the thickness of the thermal barrier coating layer was initially designed to be about 60% of the carbon fiber-reinforced composite substrate in this embodiment.

Figure 3A:
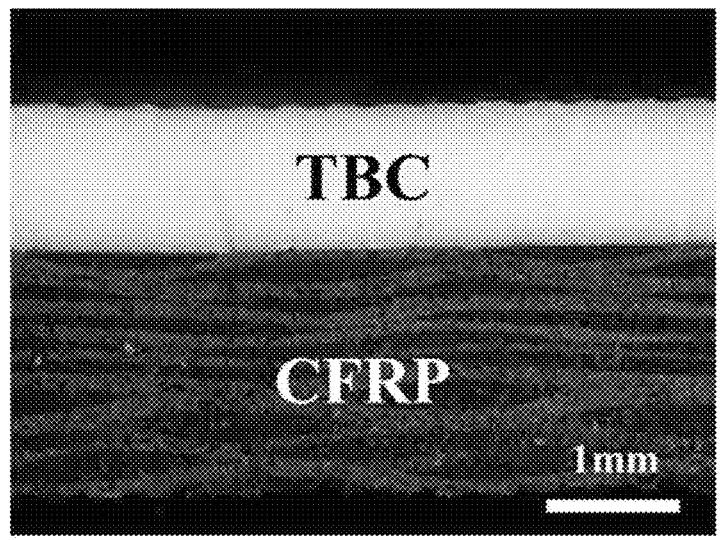
FIG. 3A is a cross-sectional optical microscope (OM) photograph of a carbon fiber-reinforced composite in which the thermal barrier coating layer according to an embodiment of the present disclosure is formed.
Figure 3B:
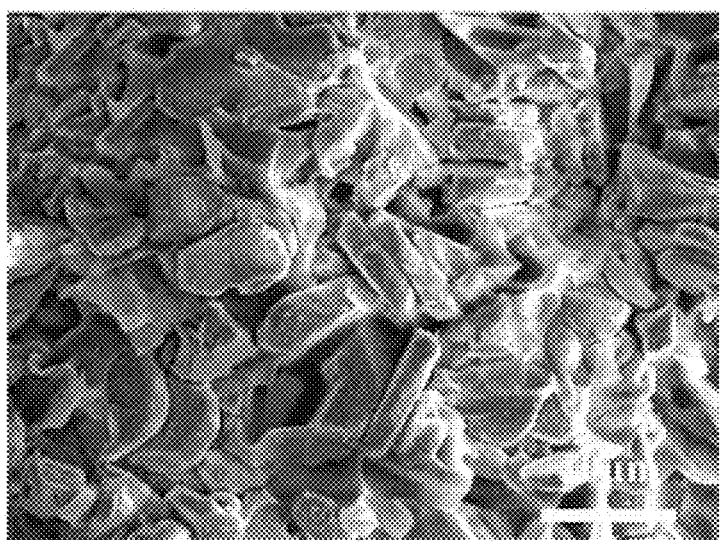
FIG. 3B is an scanning electron microscope (SEM) photograph of the thermal barrier coating layer according to an embodiment of the present disclosure.

FIG. 3A is a cross-sectional OM photograph of a carbon fiber-reinforced composite in which the thermal barrier coating layer according to an embodiment of the present disclosure is formed, FIG. 3B is a SEM photograph of the thermal barrier coating layer according to an embodiment of the present disclosure, and As illustrated in FIG. 3A, it can be seen that the thermal barrier coating layer was adhered well to the carbon fiber-reinforced composite substrate.

Figure 3C:
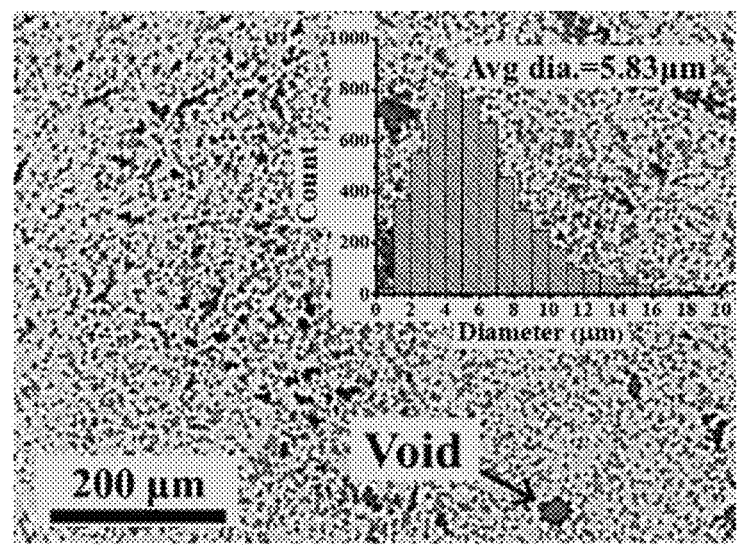
FIGS. 3C to 3F are corresponding energy-dispersive X-ray element mapping images, each illustrating the distribution of $Al_2O_3$ particles and pores inside the thermal barrier coating layer the presence of $Al_2O_3$ particles, epoxy resin, and ceramic binder in the thermal barrier coating layer according to an embodiment of the present disclosure.
Figure 3D:
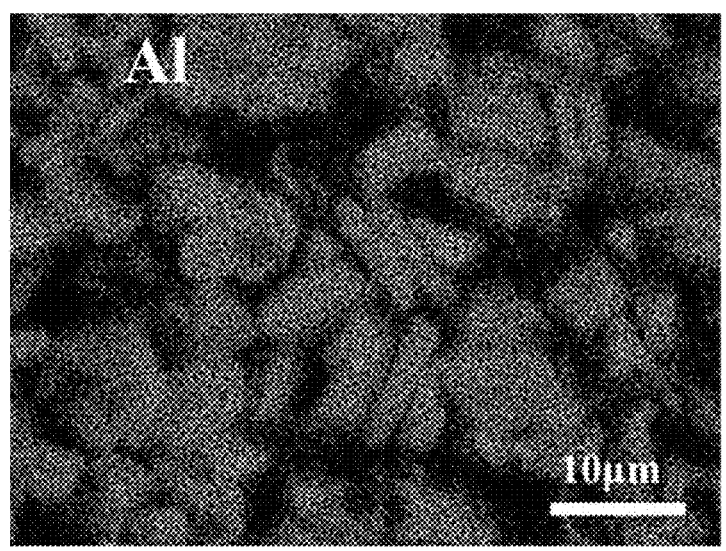
Figure 3E:
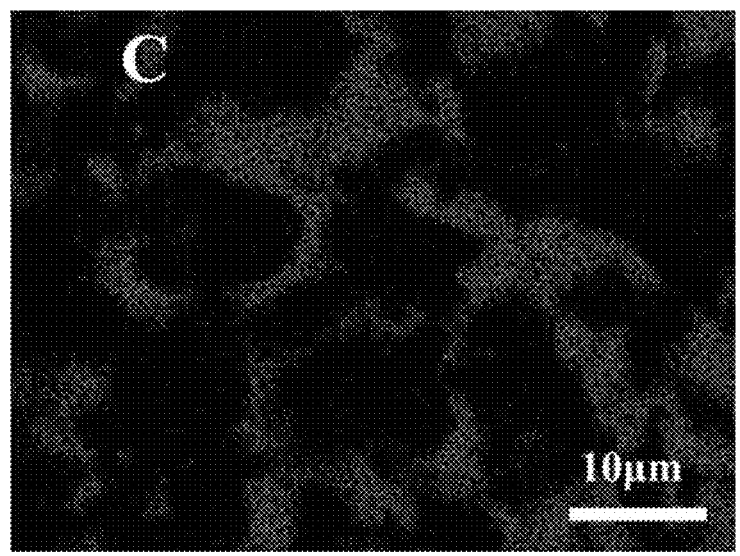
Figure 3F:
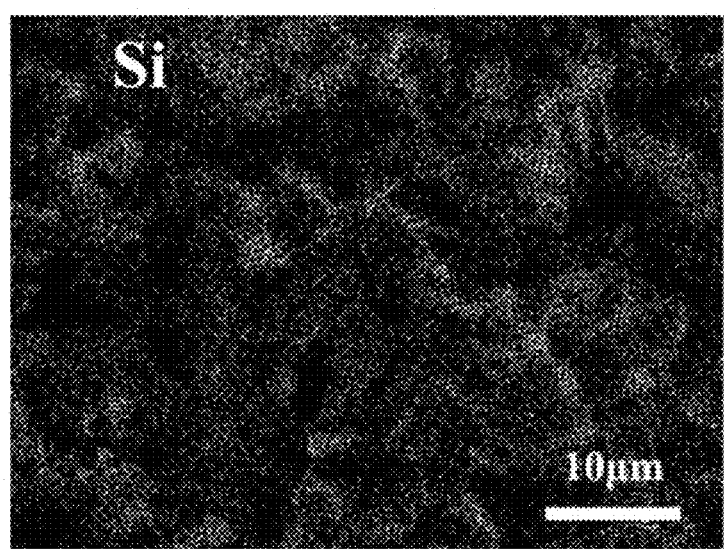

FIGS. 3C to 3F are corresponding energy-dispersive X-ray element mapping images, each illustrating the distribution of $Al_2O_3$ particles and pores inside the thermal barrier coating layer the presence of $Al_2O_3$ particles, epoxy resin, and ceramic binder in the thermal barrier coating layer according to an embodiment of the present disclosure. In FIG. 3C, it can be seen that the $Al_2O_3$ particles are colored in yellow and the pore distribution is colored in gray. Specifically, it was confirmed that the average pore size calculated from 5,500 pores in the photographed observation area was 5.83 μm and the proportion thereof was 25.6%. In addition, the density of the thermal barrier coating material before curing is 1.93 g/cm³. In FIGS. 3D to 3F, Al, C, and Si represent the presence of $Al_2O_3$ particles, epoxy resin, and ceramic binder ($K_2SiO_3$), respectively. That is, upon viewing the elemental mapping of the thermal barrier coating material, it can be seen that the $Al_2O_3$ particles are surrounded by the epoxy matrix and ceramic binder. These results show that the thermal barrier coating materials have an open-pore structure that is created when water in the ceramic binder evaporates leaving micro-pores during the curing process.

Figure 3G:
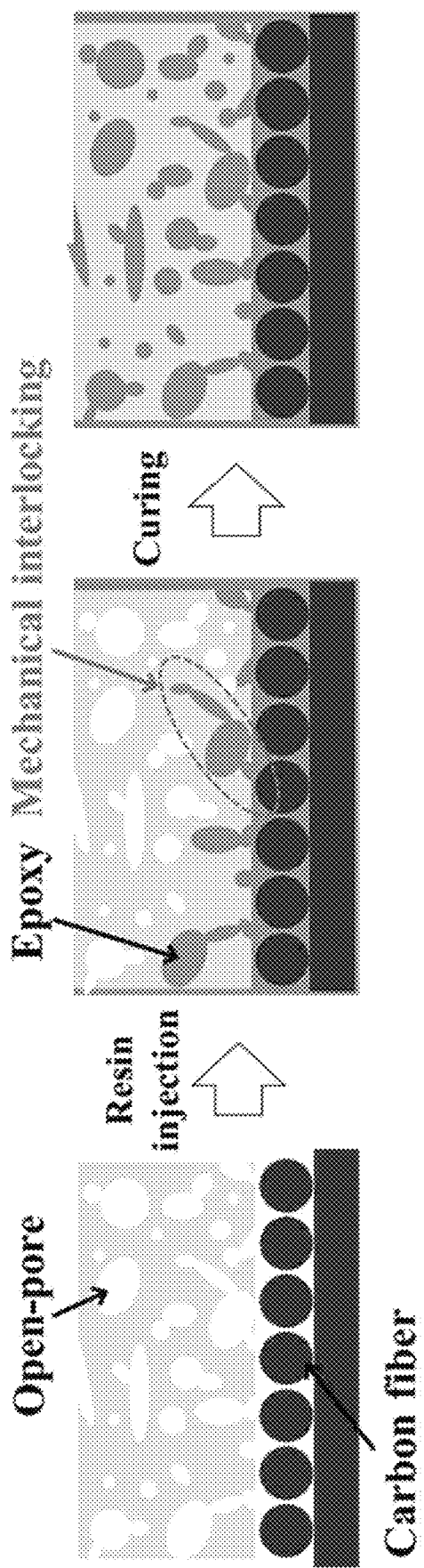
FIG. 3G is a schematic conceptual view illustrating the thermal barrier coating layer being coupled to a carbon fiber portion of the carbon fiber-reinforced composite, according to an embodiment of the present disclosure.

FIG. 3G is a schematic conceptual view illustrating the thermal barrier coating layer being coupled to a carbon fiber portion of the carbon fiber-reinforced composite, according to an embodiment of the present disclosure.

As illustrated in FIG. 3G, during the VARTM process, the supplied epoxy resin not only flows through the carbon fiber fabrics, but also into the open-pores of the thermal barrier coating layer. Then, as the epoxy resin cures, an interlocking structure may be formed between the thermal barrier coating layer and the carbon fiber-reinforced composite that creates a bond stronger than a simple interfacial adhesion.

In summary, it can be seen that during the VARTM process used to impregnate the carbon fiber fabric in an embodiment of the present disclosure, the micro-pores may be filled with the epoxy resin, so that the thermal barrier coating layer and the carbon fiber-reinforced composite substrate exhibit strong mechanical interlocking and adhesion without a separate adhesive being added.

Figure 4A:
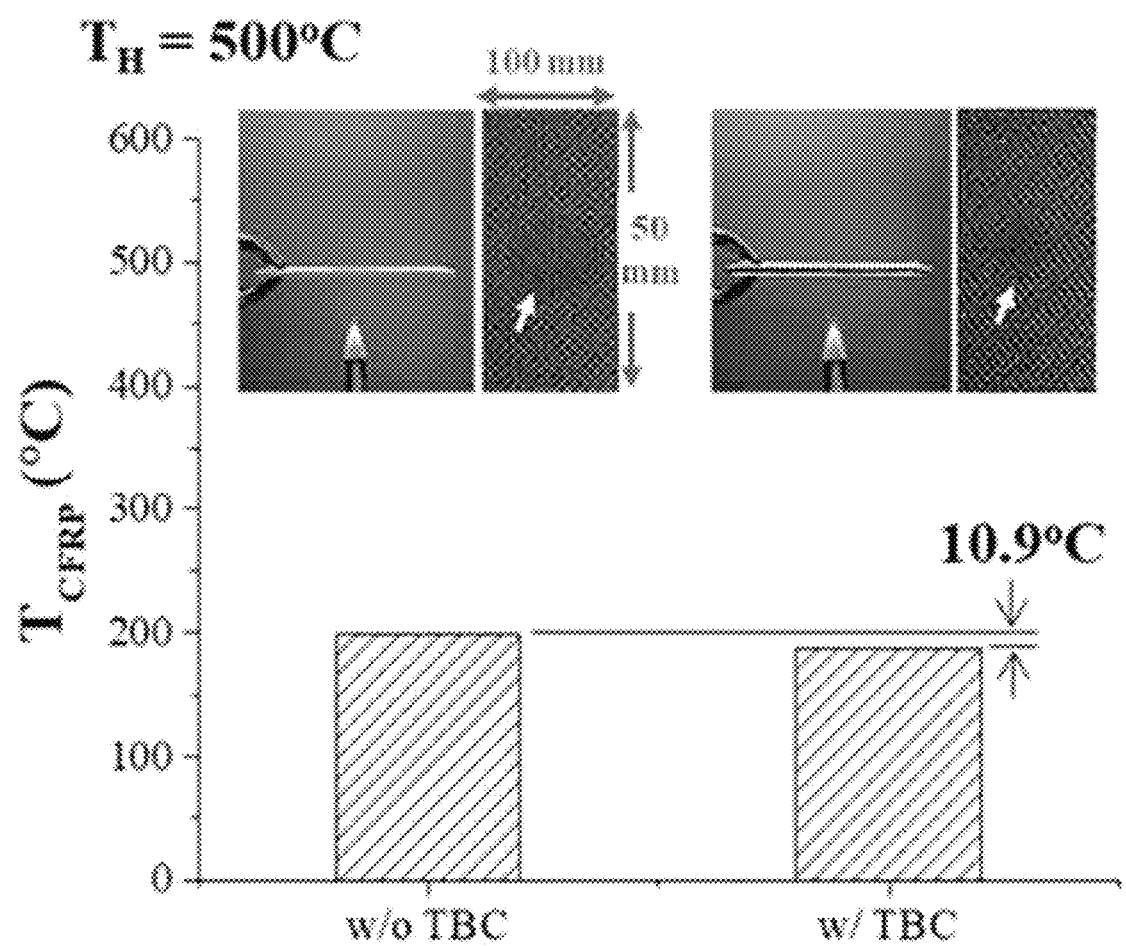
FIG. 4A to FIG. 4C are graphs illustrating the thermal protection performance of the thermal barrier coating layer according to an embodiment of the present disclosure.
Figure 4B:
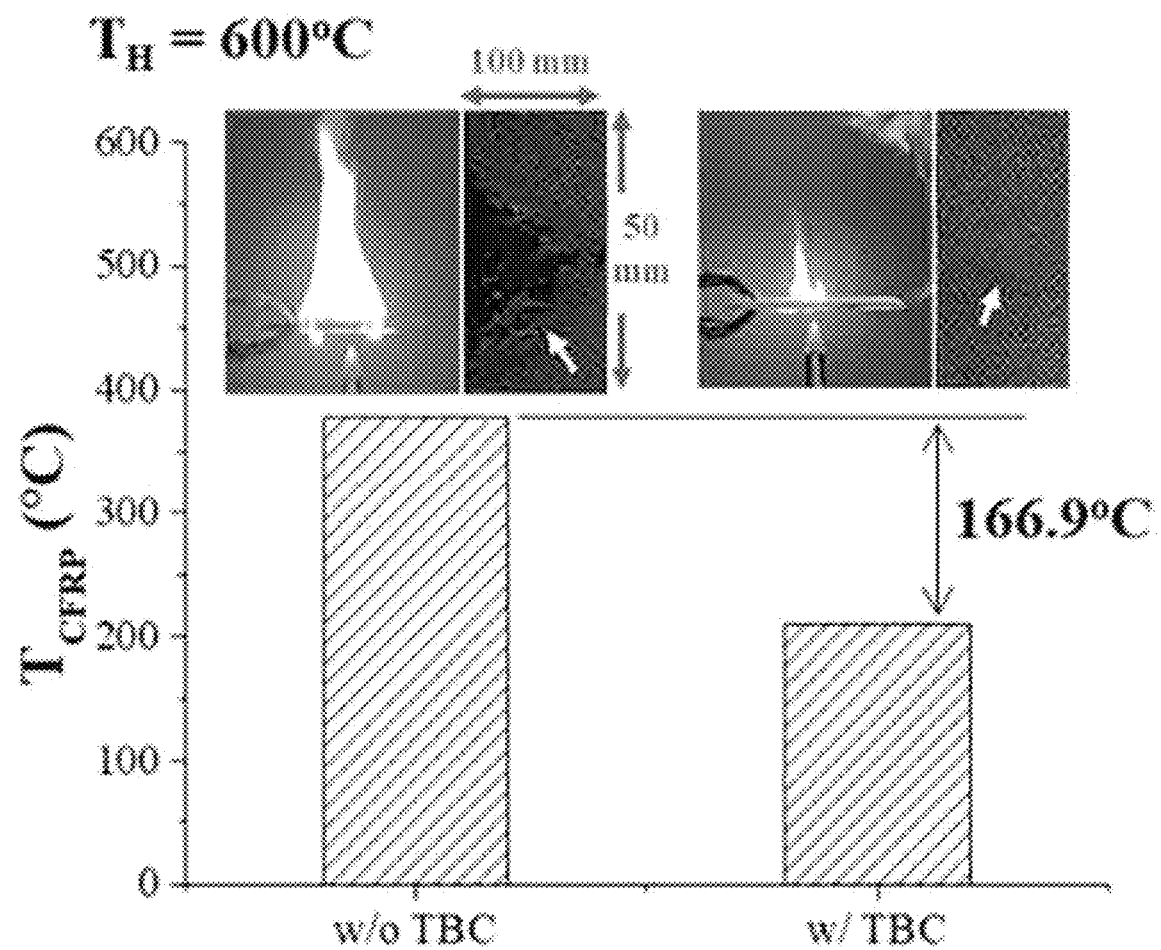
Figure 4C:
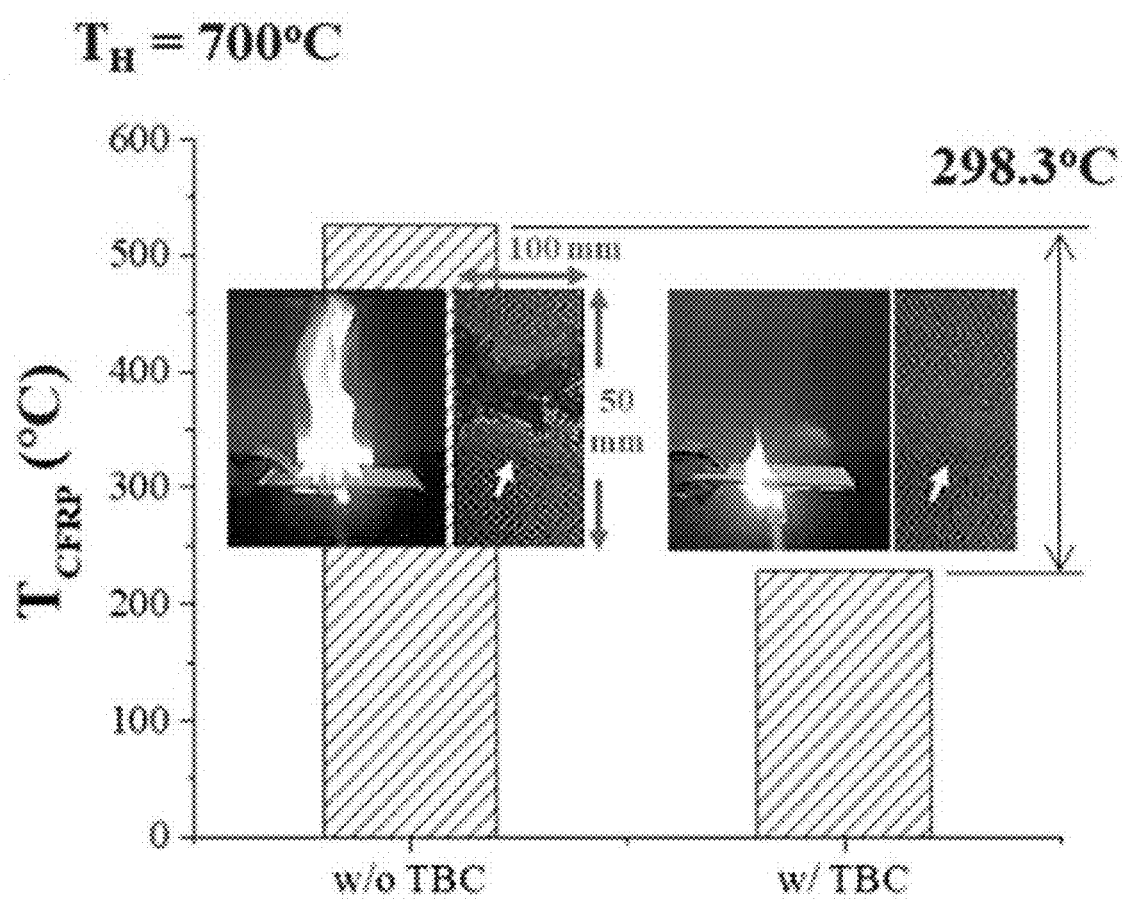

FIG. 4A to FIG. 4C are graphs illustrating the thermal protection performance of the thermal barrier coating layer according to an embodiment of the present disclosure.

In this experimental example, to evaluate the thermal protection performance of the thermal barrier coating layer, a CFRP substrate including the thermal barrier coating layer according to an embodiment of the present disclosure and a CFRP substrate without the thermal barrier coating layer were each heated using a gas burner flame.

As illustrated in FIG. 4A to FIG. 4C, in the absence of the thermal barrier coating layer, flames were observed on the upper surface of the CFRP due to significant thermal decomposition of the matrix. However, in the presence of the thermal barrier coating layer, a much smaller flame could be seen on the lower surface of the CFRP.

In addition, it can be seen that the CFRP specimens without the thermal barrier coating layer reaches 199° C. when heated to 500° C., 377° C. when heated to 600° C., and 526° C. when heated to 700° C., respectively. In contrast, the CFRP specimens with the thermal barrier coating layer showed 188° C., 211° C., and 228° C., respectively, under the same conditions.

This shows that the thermal resistance of the thermal barrier coating layer can provide an effect of a very large temperature drop across the CFRP substrate. It was confirmed that the effect of the temperature drop was greater as the heating temperature increased.

Figure 5A:
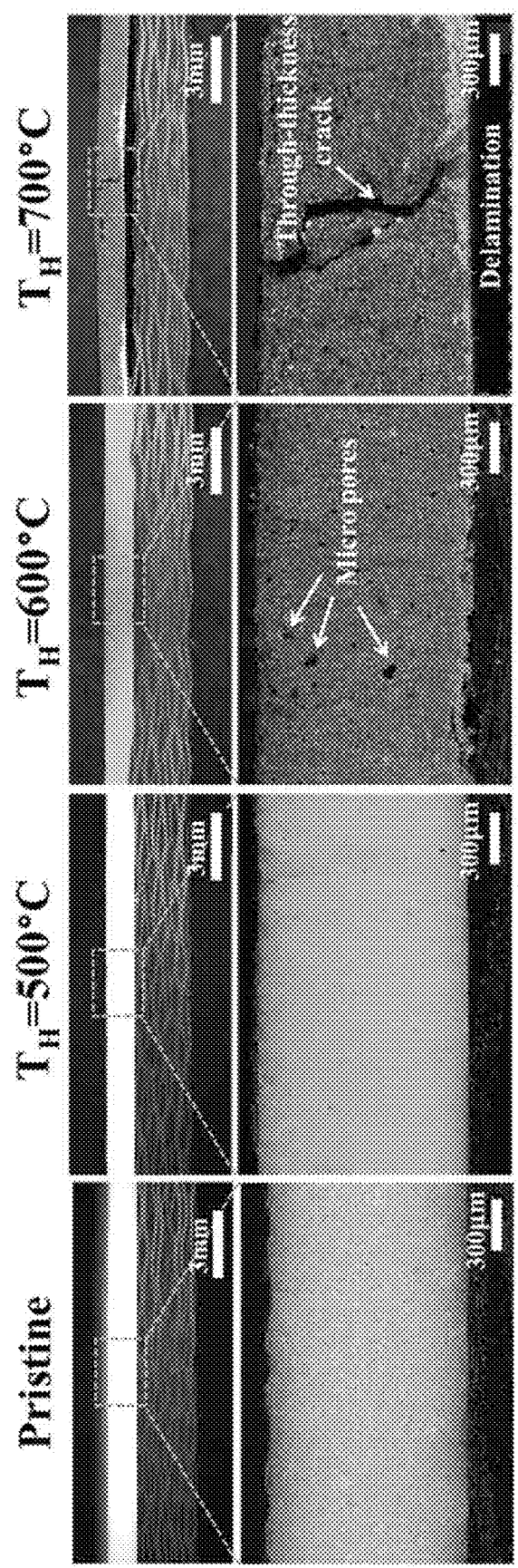
Figure 5B:
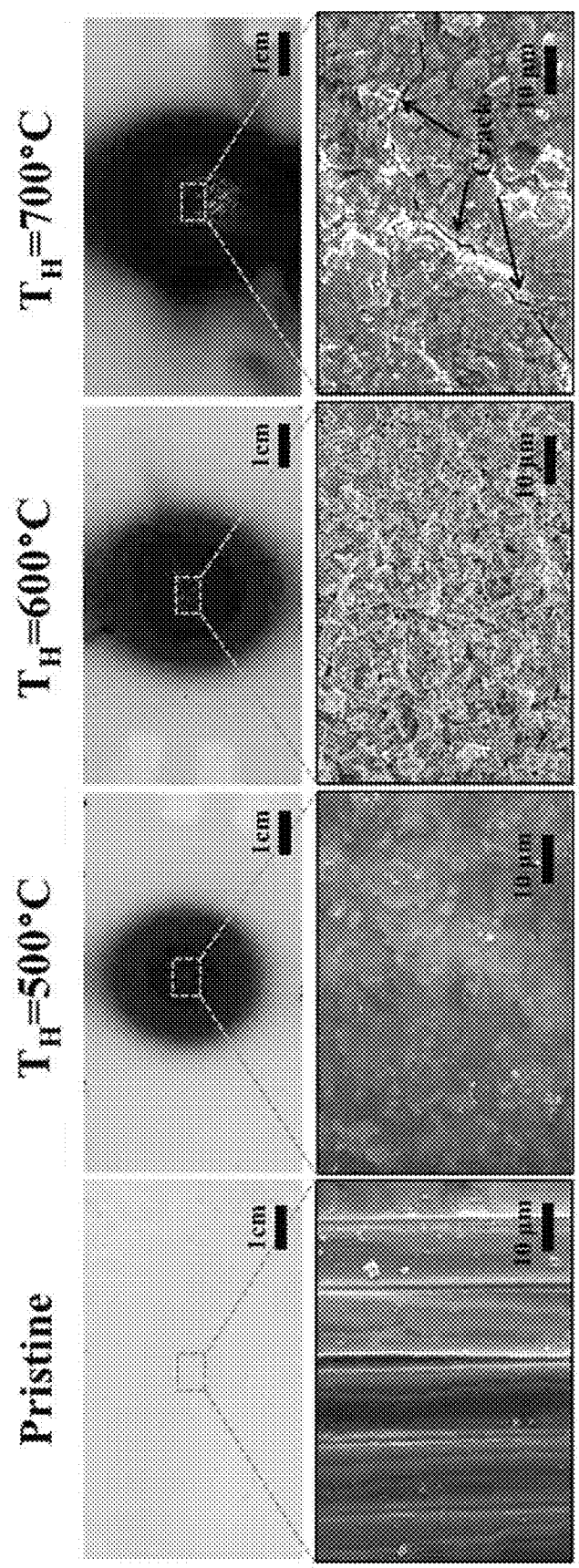

FIG. 5A and FIG. 5B are OM and SEM photographs of a carbon fiber-reinforced composite specimen according to an embodiment of the present disclosure after a thermal shock test (500~700° C.), in which FIG. 5A illustrates a cross section thereof, and FIG. 5B illustrates a surface of the thermal barrier coating layer.

In FIG. 5A, when the carbon fiber-reinforced composite with the thermal barrier coating layer was exposed to $T_H$=500° C., the coating layer exhibited some minor surface discoloration but remained intact. In addition, at $T_H$=600° C., more severe surface scorching and micro-pores were observed in the coating layer due to the thermal decomposition of the epoxy resin. At $T_H$=700° C., significant cracking and delamination occurred at the interface due to the difference in thermal stress between the thermal barrier coating layer and CFRP substrate. This is because the CFRP suppressed the thermal expansion during heating of the thermal barrier coating layer with low thermal stress, generating residual compressive stress, and the thermal gradient of the thermal barrier coating layer caused a bending moment.

As illustrated in FIG. 5A and FIG. 5B, the color change in the coating layer is related to the presence of epoxy matrix residues and carbonaceous components that may accelerate thermal damage due to the relatively high thermal conductivity.

In addition, as illustrated in FIG. 5B, the severity of epoxy matrix damage increased as the heating temperature increased. In addition, microscale cracks were observed along the boundary of the particles at $T_H$=700° C.

Figure 6A:
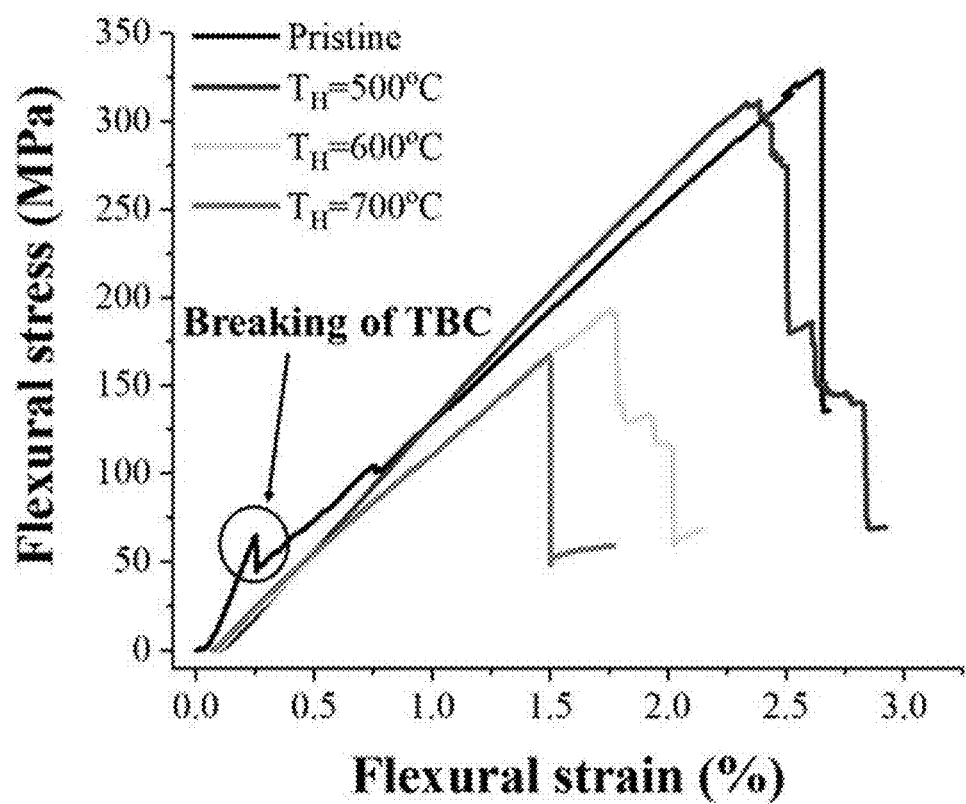
FIG. 6A and FIG. 6B are graphs comparing flexural strength and failure load of CFRP specimens including the thermal barrier coating layer before and after a thermal shock tests according to an embodiment of the present disclosure.
Figure 6B:
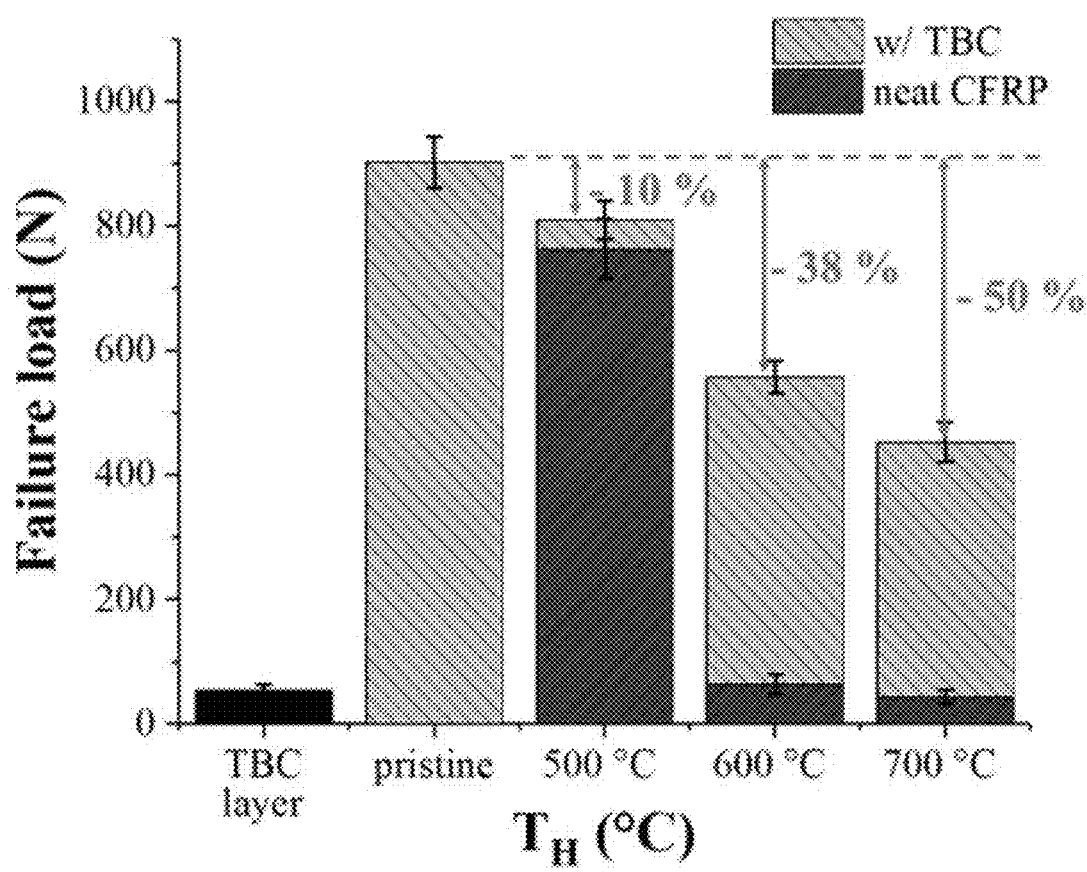

FIG. 6A and FIG. 6B are graphs comparing the flexural strength and failure load of the CFRP specimens including the thermal barrier coating layer before and after the thermal shock tests according to an embodiment of the present disclosure.

As illustrated in FIG. 6A, the failure of the thermal barrier coating in the CFRP specimens including the thermal barrier coating layer before the thermal shock tests was marked by a kink point. However, no such kink point was observed in CFRP specimens including a thermally damaged thermal barrier coating layer.

In addition, as illustrated in FIG. 6B, the failure load of the CFRP composite including the thermal barrier coating layer before the thermal shock test was 903 N, which was gradually reduced to 809 N (10% reduction), 557 N (38% reduction), and 453 N (50% reduction) after the thermal shock test at $T_H$=500° C., 600° C., and 700° C., respectively.

Meanwhile, carbon fabrics are thermally stable up to the sublimation temperature of the fiber (approximately 3,316° C.). Therefore, the carbon fabrics should not be thermally damaged after the thermal shock test. In general, the decomposition temperature of epoxy matrix is approximately 300 to 500° C. Therefore, damage was only observed where temperatures exceeded 300° C. locally around the flame surface. Accordingly, there was no drop in failure load for the neat CFRP at $T_H$=500° C. In addition, the scorching formed by the epoxy matrix decomposition and the local distortion of the specimen did not lead to structural failure. Without the thermal barrier coating layer, the failure loads of the CFRP specimens were significantly decreased, such as in the case of $T_H$=600° C. and 700° C.

In contrast, the failure loads of the CFRP specimens including the thermal barrier coating layer gradually decreased. For example, at $T_H$=500° C., the failure load was reduced by 10%, confirming that the CFRP specimen with the thermal barrier coating layer maintained 90% of the failure load.

In addition, the thermal stability of general carbon fiber reinforced epoxy matrix composite becomes poor at high temperatures in excess of 600° C. due to the decomposition of the epoxy matrix. Therefore, when the heating temperature exceeds the decomposition temperature of the epoxy matrix, significant delamination (debonding) may occur between the carbon fibers, and the thermal barrier coating layer and the CFRP, resulting in a significant decrease in flexural strength and stiffness, and as illustrated in FIG. 6B, it can be seen that the flexural failure load of the CFRP composite specimens including the thermal barrier coating layer decreased significantly at higher temperatures in excess of 600° C. as a result of interfacial weakening.

Figure 7:
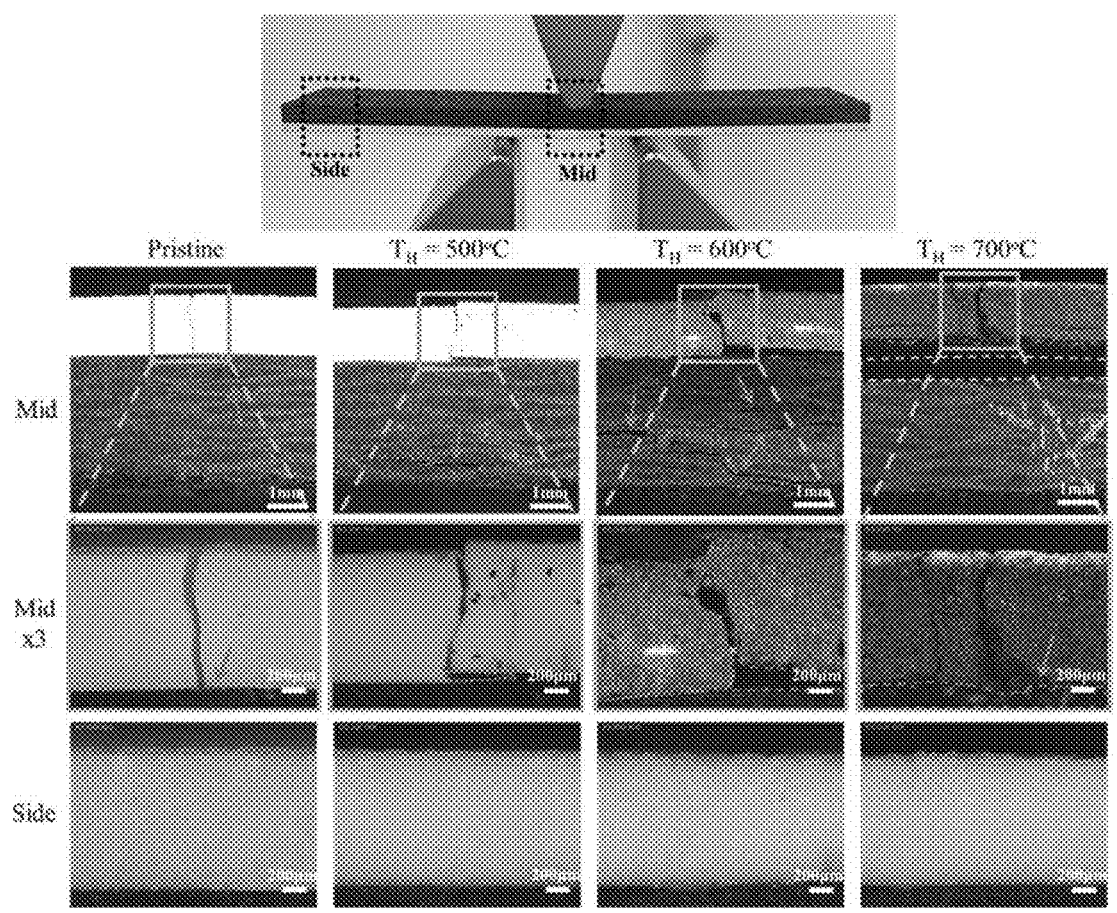
FIG. 7 is a photograph representing OM images of a cross-section of the specimen after a bending test of the CFRP specimens including the thermal barrier coating layer according to an embodiment of the present disclosure.

FIG. 7 is a photograph representing OM images of a cross-section of the specimen after a bending test of the CFRP specimens including the thermal barrier coating layer according to an embodiment of the present invention.

As illustrated in FIG. 7, at $T_H$=600° C., the number of microscale cracks (red arrows) in both the thermal barrier coating layer and the CFRP increased compared to that at $T_H$=500° C., and the color of the CFRP darkened. In addition, at $T_H$=700° C., some of the CFRP specimens was detached and lost due to the brittle nature (see orange dotted line).

In addition, as illustrated by the red dotted line in the Mid×3 portion of FIG. 7, significant cracks were observed in the thermal barrier coating layer as $T_H$ increased from 500° C. to 700° C., but it can be seen that the strong lateral interfacial adhesion was maintained even when the thermal barrier coating layer was broken into two pieces. Meanwhile, the adhesion strength of the thermal barrier coating layer to the CFRP substrate was evaluated through a single-lap shear test, with an average lap shear strength of 6.56±0.35 MPa.

Figure 8:
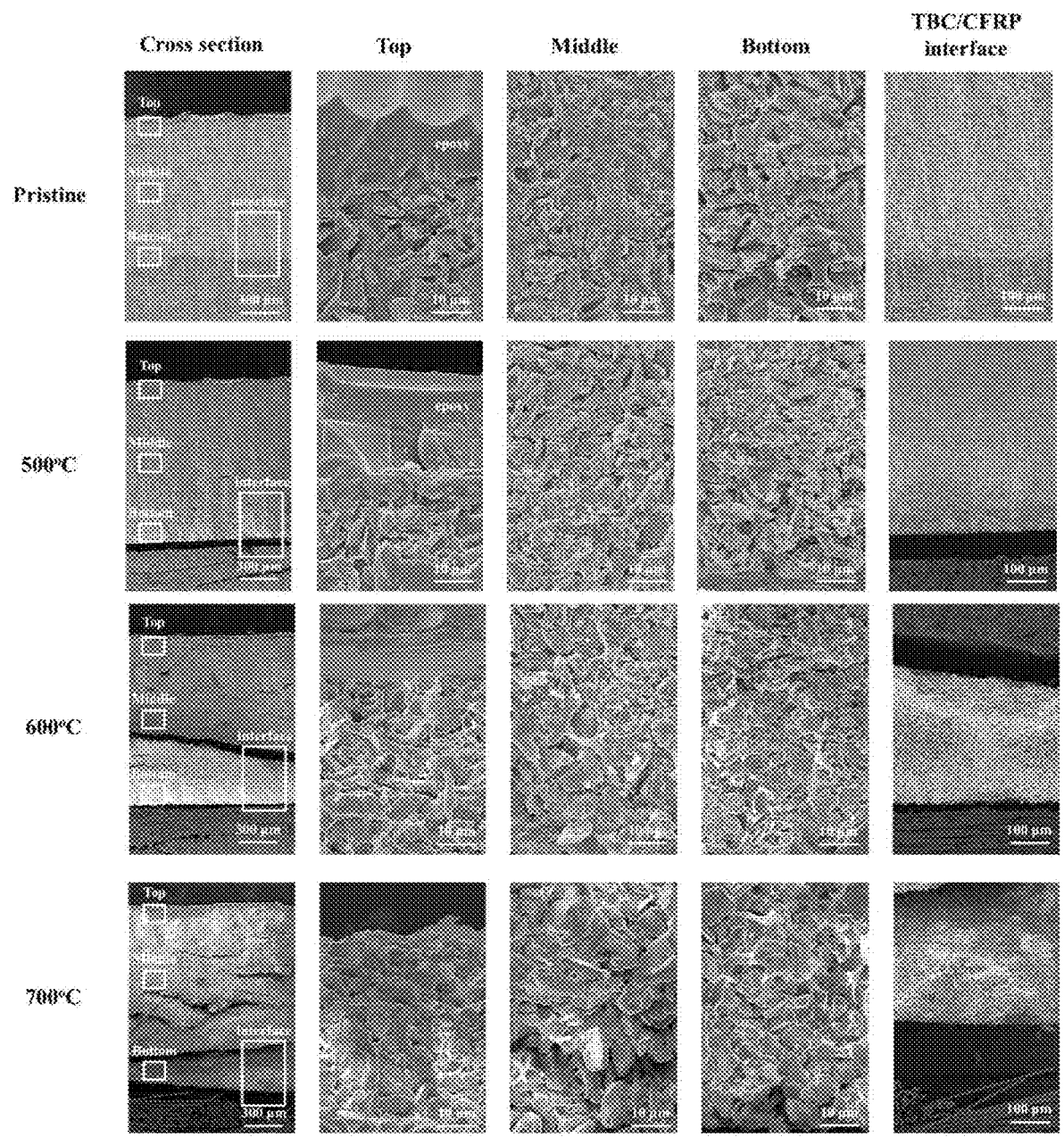
FIG. 8 is SEM images illustrating a cross-section of CFRP composite specimens including the thermal barrier coating layer according to an embodiment of the present disclosure.

FIG. 8 is SEM images illustrating a cross-sectional observation of CFRP composite specimens including the thermal barrier coating layer according to an embodiment of the present disclosure.

As illustrated in FIG. 8, at $T_H$=500° C., the wavy mark faded due to the thermal decomposition of the epoxy matrix, and at $T_H$=600° C., the epoxy matrix on the surface was completely decomposed to reveal $Al_2O_3$ particles. In addition, a thin epoxy layer was observed on the surface before the thermal shock test, but was damaged after the thermal shock test, and the layer completely disappeared at $T_H$=700° C.

Meanwhile, the thin epoxy layer may have slightly reduced the mechanical strength due to potential delamination, but the effect on the overall mechanical strength of the CFRP composite including the thermal barrier coating layer was negligible. For example, the specimen exposed to $T_H$=700° C. without a thin epoxy layer exhibited a much lower failure load than the specimen exposed to $T_H$=600° C. with a thin epoxy layer.

In addition, the middle and bottom images in FIG. 8 show that the higher thermal shock temperature caused further thermal decomposition of the epoxy matrix, as more delamination and cracking were observed after the thermal shock test. That is, it can be seen that the higher the thermal shock temperature, the greater the damage to the CFRP at the interface. For example, it can be seen that significant carbon fiber splitting and interfacial delamination between the thermal barrier coating layer and CFRP was observed at $T_H$=700° C.

A person skilled in the art may understand that the present disclosure may be carried out in other specific forms with reference to the above-mentioned descriptions without changing the technical spirit or the essential characteristics of the present disclosure.

Accordingly, it should be understood that the aforementioned embodiments are described for illustration in all aspects and are not limited, and the scope of the present disclosure shall be represented by the claims to be described below, and it should be construed that all of the changes or modified forms derived from the meaning and the scope of the claims, and an equivalent concept thereto are included in the scope of the present disclosure.

What is claimed is:

1. A method of manufacturing a carbon fiber-reinforced composite including a thermal barrier coating layer, the method comprising:
preparing a thermal barrier coating layer comprising a porous mixture of $\alpha$-$Al_2O_3$ powders and a ceramic binder;
preparing a substrate including a carbon fiber fabric; and
attaching the thermal barrier coating layer on an upper portion of the substrate and molding a composite with a vacuum-assisted resin transfer molding wherein the resin flows into the pores of the thermal barrier coating layer and through the carbon fiber fabric.

2. The method of claim 1, wherein a thickness of the thermal barrier coating layer is 60 to 65% of a thickness of the substrate.

3. The method of claim 2, wherein the preparing of the thermal barrier coating layer comprises a mixture of $\alpha$-$Al_2O_3$ powders and a ceramic binder, and subjecting the mixture to a first cure at 96° C., a second cure at 175° C., and a third cure at 275° C.

4. The method of claim 3, wherein the $\alpha$-$Al_2O_3$ powders and the ceramic binder are mixed in a weight ratio of 3:1 to 4:1.

5. The method of claim 4, wherein the thermal barrier coating layer completed to the third cure comprises a plurality of pores.

6. The method of claim 5, wherein the pores are formed by evaporation of moisture included in the ceramic binder.

7. The method of claim 6, wherein the porosity of the thermal barrier coating layer is 25 to 30%.

8. The method of claim 7, wherein the resin transfer molding is carried out using an epoxy resin as a matrix material, curing at 120° C. for one hour and at 150° C. for three hours.

9. The method of claim 8, wherein the epoxy resin is filled with the pores during the vacuum-assisted resin transfer molding.

10. The method of claim 9, wherein a volume fraction of the carbon fiber fabric for the carbon fiber-reinforced composite is 60 to 65%.

11. A method of manufacturing a carbon fiber-reinforced composite including a thermal barrier coating layer, the method comprising:
preparing a thermal barrier coating layer comprising a mixture of $\alpha$-$Al_2O_3$ powders and a ceramic binder, and subjecting the mixture to a first cure at 96° C., a second cure at 175° C., and a third cure at 275° C.;
preparing a substrate including a carbon fiber fabric; and
attaching the thermal barrier coating layer on an upper portion of the substrate and molding a composite with a vacuum-assisted resin transfer molding.

* * * * *